(12) United States Patent
Pursifull

(10) Patent No.: US 9,759,168 B2
(45) Date of Patent: Sep. 12, 2017

(54) INCREASING CRANKCASE VENTILATION FLOW RATE VIA ACTIVE FLOW CONTROL

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/706,689

(22) Filed: May 7, 2015

(65) Prior Publication Data
US 2016/0326990 A1 Nov. 10, 2016

(51) Int. Cl.
| | | |
|---|---|---|
| F02M 25/08 | (2006.01) | |
| F02M 35/10 | (2006.01) | |
| F02M 25/06 | (2016.01) | |
| F02D 41/00 | (2006.01) | |
| F01M 13/00 | (2006.01) | |

(52) U.S. Cl.
CPC .......... *F02M 25/089* (2013.01); *F01M 13/00* (2013.01); *F02D 41/0002* (2013.01); *F02D 41/0032* (2013.01); *F02M 25/06* (2013.01); *F02M 35/10229* (2013.01); *F01M 2013/0022* (2013.01); *F01M 2013/0077* (2013.01); *F02D 2250/08* (2013.01); *F02D 2250/41* (2013.01)

(58) Field of Classification Search
CPC ....... F02M 35/10229; F02M 35/10118; F02M 26/05; F02M 35/10163; F02D 41/0007; F02D 2009/024; F02D 41/0032
USPC ............................................... 123/41.86, 574
See application file for complete search history.

(56) References Cited

U.S. PATENT DOCUMENTS

| | | |
|---|---|---|
| 3,111,138 A | 11/1963 | Humphreys et al. |
| 4,318,374 A | 3/1982 | Yasuhara |
| 5,005,550 A | 4/1991 | Bugin, Jr. et al. |
| (Continued) | | |

FOREIGN PATENT DOCUMENTS

| | | |
|---|---|---|
| DE | 202005003432 U1 | 5/2005 |
| EP | 1959117 A1 | 8/2008 |
| EP | 2182185 A1 | 5/2010 |

OTHER PUBLICATIONS

Pursifull R. et al., "Method for Reducing Air Flow in an Engine at Idle," U.S. Appl. No. 14/628,029, filed Feb. 20, 2015, 59 pages.
(Continued)

*Primary Examiner* — Hai Huynh
*Assistant Examiner* — Long T Tran
(74) *Attorney, Agent, or Firm* — Julia Voutyras; McCoy Russell LLP

(57) ABSTRACT

Methods and systems are provided for coordinating throttle bypass flows from brake booster vacuum reservoir, a fuel vapor purge system, and a crankcase ventilation system via active, electrical control of a crankcase ventilation valve. In one example, a method may include actively opening the crankcase ventilation valve to allow crankcase ventilation flow into the engine during conditions in which doing so will not result in engine air flow rate and/or engine fuel flow rate exceeding desired rates. Priority is given first to brake booster replenishment, then to fuel vapor purging, and then to crankcase ventilation during conditions where all three throttle bypass flows are desired.

18 Claims, 5 Drawing Sheets

(56) References Cited

U.S. PATENT DOCUMENTS

| | | |
|---|---|---|
| 5,349,935 A | 9/1994 | Mezger et al. |
| 5,408,866 A | 4/1995 | Kawamura et al. |
| 5,499,616 A | 3/1996 | Enright |
| 5,531,188 A | 7/1996 | Tomasulo |
| 5,592,923 A | 1/1997 | Machida |
| 5,699,947 A | 12/1997 | Cavallo et al. |
| 5,714,683 A * | 2/1998 | Maloney ............ F02D 41/1401 340/451 |
| 6,047,670 A | 4/2000 | Stella et al. |
| 6,052,644 A | 4/2000 | Murakami et al. |
| 6,637,416 B2 | 10/2003 | Wakahara |
| 6,688,104 B2 | 2/2004 | Baeuerle et al. |
| 6,712,049 B2 | 3/2004 | Kawano |
| 6,779,388 B2 | 8/2004 | Baeuerle et al. |
| 6,804,995 B2 | 10/2004 | Kawano |
| 6,832,147 B2 | 12/2004 | Vornehm et al. |
| 6,910,467 B2 | 6/2005 | Murakami et al. |
| 6,968,732 B2 | 11/2005 | Nakoji |
| 7,007,682 B2 | 3/2006 | Takahashi et al. |
| 7,011,690 B2 | 3/2006 | Altvater et al. |
| 7,212,905 B2 | 5/2007 | Grill |
| 7,275,527 B2 | 10/2007 | Bruchner et al. |
| 7,316,223 B2 | 1/2008 | Wakahara |
| 7,523,748 B2 | 4/2009 | Hirano et al. |
| 7,743,752 B2 | 6/2010 | Kerns et al. |
| 7,810,475 B2 | 10/2010 | Peters et al. |
| 7,886,727 B2 | 2/2011 | Ulrey et al. |
| 8,109,259 B2 | 2/2012 | Ulrey et al. |
| 8,312,765 B2 | 11/2012 | Pursifull et al. |
| 8,505,518 B2 | 8/2013 | Mallebrein et al. |
| 9,027,536 B2 | 5/2015 | Pursifull et al. |
| 2002/0033157 A1 | 3/2002 | Thompson et al. |
| 2005/0015196 A1 | 1/2005 | Hawkins |
| 2006/0011163 A1 | 1/2006 | Watanabe et al. |
| 2007/0199550 A1* | 8/2007 | Lindmark ............ F02M 25/06 123/572 |
| 2008/0173284 A1 | 7/2008 | Kavanagh et al. |
| 2009/0090337 A1 | 4/2009 | Asanuma et al. |
| 2009/0308364 A1 | 12/2009 | Konohara |
| 2009/0320809 A1 | 12/2009 | Ruppel et al. |
| 2013/0233287 A1* | 9/2013 | Leone .................. F02M 25/08 123/520 |
| 2013/0340732 A1* | 12/2013 | Pursifull .......... F02M 35/10222 123/572 |
| 2014/0014080 A1* | 1/2014 | Beshay ............... F01M 13/023 123/574 |
| 2014/0318514 A1 | 10/2014 | Pursifull |
| 2015/0059719 A1* | 3/2015 | Bidner ............... F01M 13/028 123/574 |

OTHER PUBLICATIONS

Pursifull R. et al., "Method for Crankcase Ventilation in a Boosted Engine," U.S. Appl. No. 14/743,280, filed Jun. 18, 2015, 52 pages.

\* cited by examiner

INCREASING CRANKCASE VENTILATION FLOW RATE VIA ACTIVE FLOW CONTROL

FIELD

The present description relates generally to methods and systems for coordinating throttle bypass flows into an engine of a vehicle from a fuel vapor purge system, a brake booster, and a crankcase ventilation system.

BACKGROUND/SUMMARY

Unburned fuel and other combustion products may escape past the piston of an internal combustion engine (e.g., an internal combustion engine of a vehicle) into the crankcase. The resulting gases in the crankcase, often referred to as "blowby" gases, may contribute to the formation of sludge in the engine oil supply. Further, blowby gases may excessively pressurize the crankcase, resulting in undesirable leakage of oil pan gasket and crankcase seals.

To avoid these issues, an engine may include a positive crankcase ventilation (PCV) system coupled to the intake, which serves to vent blowby gases from the crankcase to the intake. The PCV system may include a PCV valve arranged intermediate the crankcase and the engine intake passage, to regulate the flow of blowby gases from the crankcase to the intake manifold. Various types of PCV valves may be used in PCV systems to regulate crankcase ventilation flow. One standard PCV valve configuration includes three different-sized orifices. A large orifice is arranged in series with a variable pressure control valve. The series arrangement of the large orifice and the variable pressure control valve is arranged in parallel with a small orifice. This parallel arrangement is arranged in series with a parallel arrangement of a tiny orifice and a check valve, the check valve configured to allow flow from the crankcase to the intake manifold to the engine intake passage and restrict flow from the engine intake passage to the crankcase. In the case of low intake manifold vacuum, the variable pressure control valve opens and allows air flow through the large orifice. In this condition, the engine can accept the larger air flow rate, which is near the target crankcase ventilation flow rate. In the case of negative intake manifold vacuum (positive pressure), air flow passes from the intake manifold to the crankcase through the tiny orifice. In the case of high intake manifold vacuum, the variable pressure control valve shuts, and gasses flow from the crankcase to the intake manifold through the small orifice. Thus, the PCV valve limits the flow of crankcase ventilation air into the intake manifold during idle conditions, to reduce the idle air flow rate and thereby limit engine air consumption at idle. The limited flow of crankcase ventilation air into the intake manifold during idle conditions may ensure that adequate engine air flow budget is left over for other flows entering the engine intake downstream of the throttle such as fuel vapor purge flow and flow from an aspirator which serves to generate brake booster vacuum, such that coordination/arbitration of the various throttle bypass flows is not needed.

However, the inventors herein have recognized potential issues with such systems. For example, while the limited crankcase ventilation flow occurring via the small orifice during idle conditions may be appropriate during minimum engine air flow conditions (e.g., during warm idle conditions with the transmission in neutral and low front end accessory drive (FEAD) loads), these conditions may be relatively rare. Indeed, in some start/stop engines, these conditions may be almost extinct. The design of the standard PCV valve described above, which limits crankcase ventilation flow during all idle conditions to a level appropriate for minimum engine air flow conditions, may be undesirable for several reasons. For example, the amount of crankcase ventilation flow which is appropriate for minimum engine air flow conditions may not provide adequate crankcase ventilation during other idle conditions, e.g. when intake manifold vacuum is in the range of 20-80 kPa. Further, in the context of gasoline direct injection engines, increased crankcase ventilation may be desirable due to fuel dilution which may occur during warm-up or in cold weather conditions. For example, during such conditions, crankcase oil may be diluted by un-combusted injected fuel which enters the crankcase. Furthermore, the efficiency of oil separators may be highest in a narrow flow rate band, and thus a constant and adequate crankcase ventilation flow rate may increase oil separation. The oil separation is typically poor when flowing through the small orifice, since this results in low velocity through the oil separator.

In one example, the issues described above may be addressed by a method for an engine including electrically controlling a crankcase ventilation valve to selectively enable crankcase ventilation flow into an engine intake downstream of a throttle based on desired engine air and fuel flow rates, current engine air flow rate contributions from a brake booster, and current engine air and fuel flow rate contributions from a fuel vapor purge system. In this way, rather than restricting crankcase ventilation flow to a level that is acceptable during minimum engine air flow conditions, crankcase ventilation flow may be actively controlled via electrical control of the crankcase ventilation valve such that higher levels of crankcase ventilation flow are achieved during conditions where such flow will not result in engine air flow rate and/or fuel flow rate exceeding a desired amount for current engine operating conditions. Put another way, engine operating conditions in which crankcase ventilation flow will result in excessive engine air flow/fuel flow may only occur when the transmission is neutral, the engine and catalyst are warmed up, and FEAD load is below a threshold. Accordingly, active control of a crankcase ventilation valve may result in increased crankcase ventilation flow, which may advantageously increase crankcase ventilation and oil separation and reduce fuel dilution. The electrical control of the crankcase ventilation valve may be achieved via control of a solenoid valve integrated in the crankcase ventilation valve. The crankcase ventilation valve may further include one or more orifices integrated therein, and may further include a variable pressure control valve in some examples.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
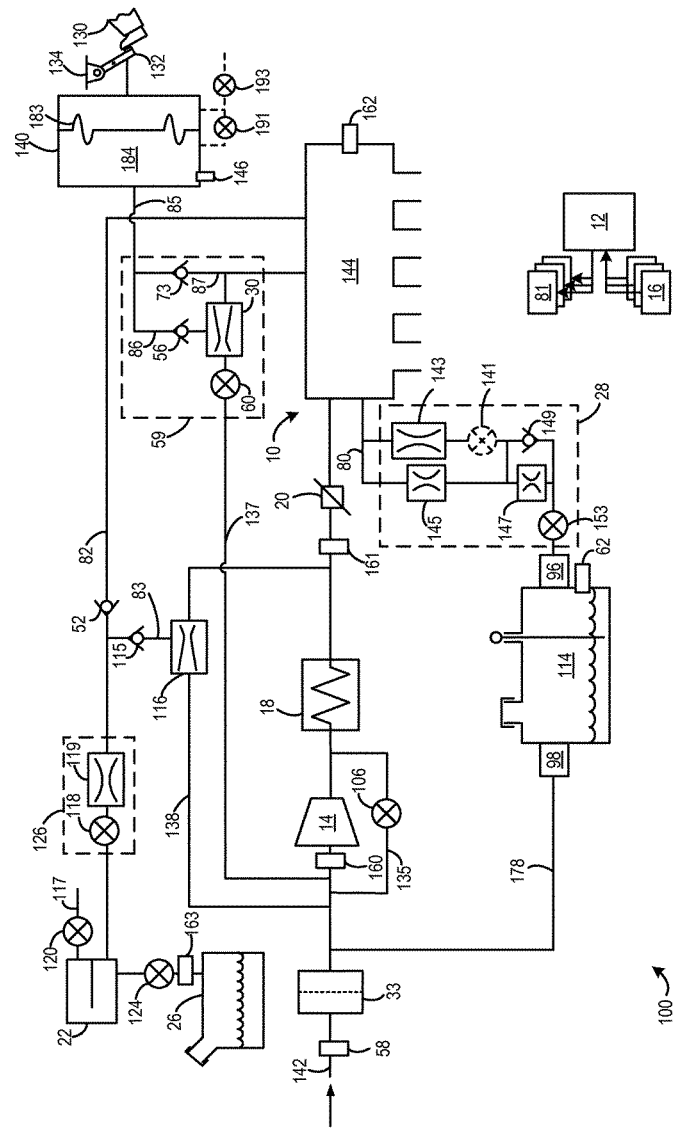
FIG. 1 is a schematic diagram of an example engine system.

The following description relates to system and methods for coordinating a plurality of flows entering an intake of a vehicle engine downstream of a throttle. As shown in FIG. 1, the intake manifold of an engine may receive fresh air from an intake passage of the engine, where an amount of fresh air supplied to the intake manifold is regulated by the position of a throttle in the intake passage. However, the intake manifold may also receive gasses from a brake booster vacuum reservoir, fuel vapor purge canister, and engine crankcase. Each of these sources of gas may bypass the throttle and be directed to the engine intake downstream of the throttle (e.g., to the intake manifold) via distinct pathways. As such, whereas the flow of fresh air into the intake manifold may be regulated by the position of the throttle, the gas flows entering the intake may be regulated by valves positioned in each of the distinct pathways. For example, an electrically-controlled aspirator shut-off valve (ASOV) may be positioned in a flow path between the brake booster vacuum reservoir and the engine intake downstream of the throttle. Further, an electrically-controlled canister purge valve (CPV) may be positioned in the flow path between the purge canister and the intake manifold, and a PCV valve (alternatively referred to herein as a crankcase ventilation valve) may be positioned in the flow path between the crankcase and the intake manifold. The PCV valve may comprise a variable pressure control valve (e.g., a spring-actuated valve), one or more orifices, one or more check valves, and a solenoid for controlling gas flow between the crankcase and the intake manifold. The flows of brake booster gasses, fuel vapor purge gasses, and crankcase gasses to the intake manifold may all be regulated by an engine controller, by adjusting the positions of an ASOV, a CPV, and a PCV valve, respectively. Said another way, the electrically controlled valves may be adjusted to coordinate the flows of the gasses to the intake manifold that bypass the throttle. More specifically, as described with respect to FIGS. 3 and 4, the PCV valve, ASOV, and CPV may be individually adjusted to provide, in conjunction with the flow of fresh air regulated by the throttle, a desired air flow rate and fuel flow rate to the intake manifold. The ASOV may be opened whenever a level of vacuum stored in the brake booster vacuum reservoir drops below a threshold vacuum level as discussed with respect to FIG. 5. If a concentration of fuel vapors stored in a fuel vapor canister exceeds a threshold concentration, then the CPV may be opened to allow gasses to flow from the purge canister to the intake manifold. However, the CPV may remain closed if its opening would cause the air or fuel flow rates entering the intake manifold to exceed desired rates. Further, if the ASOV is open, the CPV may only be opened if its opening would not result in a rate of air flow entering the intake manifold exceeding a desired rate and/or a rate of fuel flow entering the intake manifold exceeding a desired rate. The PCV valve may default to an open position (e.g., wherein a solenoid valve integrated therein is open). However, during conditions where brake booster replenishment and/or fuel vapor purging is occurring, the PCV valve may be closed if the flow of crankcase gasses into the intake manifold will cause the air and/or fuel flow rates entering the engine to exceed desired rates. Since opening durations of the CPV and ASOV may be relatively short, the portion of engine operation during which the PCV valve is open may be increased via the active control of the throttle bypass flows described herein. In another example, the PCV valve may also be closed during conditions where the engine air flow rate is at or below a minimum engine air flow rate, such as when a vehicle transmission (shown in FIG. 2) is in neutral and the engine and one or more engine catalysts are warmed up, and a FEAD load is below a threshold. These conditions may occur infrequently, especially in start/stop engines. Thus, by integrating an electrically controlled valve in the PCV valve, the steadiness and amount of crankcase ventilation flow into the intake manifold during engine operation may be increased. Increasing the regularity and quantity of crankcase ventilation flow may increase the fuel efficiency during idle, oil separator performance, and engine performance in cold weather or during short durations of engine use.

Referring now to FIG. 1, it shows aspects of an example engine system 100 for a motor vehicle. The engine system is configured for combusting fuel vapor accumulated in at least one component thereof. Engine system 100 includes a multi-cylinder internal combustion engine, generally depicted at 10, which may be included in a propulsion system of an automotive vehicle. Engine 10 may be controlled at least partially by a control system including controller 12 and by input from a vehicle operator 130 via an input device 132. In this example, input device 132 includes brake pedal. A pedal position sensor 134 generates a proportional pedal position signal PP. The control system may include a powertrain control module (PCM).

Engine 10 includes an air intake throttle 20 fluidly coupled to an engine intake manifold 144 along an intake passage 142. Air enter intake passage 142 from the vehicle's environment may pass through an air cleaner 33 arranged upstream of throttle 20. A position of throttle 20 may be varied by controller 12 via a signal provided to an electric motor or actuator included with the throttle 20, a configuration that is commonly referred to as electronic throttle control (ETC). In this manner, the throttle 20 may be operated to vary the intake air provided to intake manifold 144 and the plurality of cylinders therein. A mass air flow sensor 58 may be coupled in intake passage 142 for providing a signal regarding mass air flow (MAF). A throttle inlet pressure sensor 161 may be coupled immediately upstream of throttle 20 for providing a signal regarding throttle inlet pressure (TIP). A manifold air pressure sensor 162 may be coupled to intake manifold 144 for providing a signal regarding manifold air pressure (MAP) to controller 12.

Engine system 100 may further include a turbocharger compressor 14 for providing a boosted intake air charge to intake manifold 144. Compressor 14 may be mechanically coupled to and driven by a turbine powered by hot exhaust gas flowing from the engine. In the configuration illustrated in FIG. 1, the turbocharger compressor draws fresh air from air cleaner 33, compresses the air, and flows the compressed air through an intercooler 18. The intercooler cools the compressed air, which then flows to intake manifold 144 depending on a position of throttle valve 20.

A compressor bypass 135 may be coupled across compressor 14 to divert a portion of intake air compressed by compressor 14 back upstream of the compressor. An amount of air diverted through bypass 135 may be controlled by opening a compressor bypass valve (CBV) 106. In some examples, CBV 106 may be a continuous compressor recirculation valve. By controlling CBV 106 to vary an amount of air diverted through the bypass passage 135, the boost pressure downstream of the compressor can be regulated. This enables boost control and surge control. A compressor inlet pressure sensor 160 is coupled immediately upstream of the compressor for providing a signal regarding compressor inlet pressure (CIP) to controller 12.

Engine system 100 may include one or more vacuum consumption devices that are vacuum-actuated. As one example, an ejector 116 may be positioned in a conduit 138 coupled to the intake passage upstream of the compressor and downstream of the compressor. In particular, a portion of intake air may flow, via conduit 138, from downstream of intercooler 18 and upstream of throttle 20 to the intake passage at a location which is upstream of compressor 14. In another example, the end of conduit 138 proximal to the intake manifold may be coupled to the intake passage downstream of the compressor and upstream (rather than downstream) of the intercooler. While flowing through conduit 138, the air may pass through ejector 116, generating vacuum at the ejector's vacuum inlet. As shown in FIG. 1, ejector 116 may be arranged such that air flowing from the intake passage downstream of the compressor towards the intake passage upstream of the compressor first enters a converging portion of the ejector and then flows out of a diverging portion of the ejector. As described further below, a suction inlet of ejector 116 may be coupled to a conduit which directs fuel vapor purge gases from a fuel vapor purge system to the engine intake. In this way, during conditions where motive flow travels through conduit 138 and thus through the motive portion of ejector 116, a portion of fuel vapor purge gases may flow into the suction inlet of ejector 116 and then into the intake passage upstream of the compressor.

The engine system 100 may additionally include a brake booster 140 coupled to vehicle wheel brakes (not shown). A vacuum reservoir 184 of brake booster 140 may be coupled to the engine intake via brake booster vacuum line 85 along with line 86 and/or line 87, depending on engine operating conditions. As shown, line 85 diverges into lines 86 and 87. A first end of line 87 is coupled to line 85, and a second end of line 87 is coupled to the engine intake downstream of the throttle (e.g., to the intake manifold as shown in FIG. 1). A check valve 73 coupled within line 87 allows air to flow to the engine intake from brake booster 140 while limiting air flow to brake booster 140 from the engine intake. A first end of line 86 is coupled to line 85, while a second end of line 86 is coupled to a suction inlet of an aspirator 30, which will be described in further detail below. A motive outlet of aspirator 30 fluidly communicates with line 87 downstream check valve 73 and upstream of the engine intake (e.g., the intake manifold).

Vacuum reservoir 184 may be arranged behind a diaphragm 183 of the brake booster for amplifying a force provided by vehicle operator 130 via input device 132 for applying vehicle wheel brakes (not shown). In one embodiment, the brake pedal 132 may be mechanically coupled to the brake booster 140. Depression of the brake pedal 132 may open a valve in the brake booster 140 (not shown) allowing outside air to flow into the brake booster 140 on only one side of the diaphragm 183. As such, the force applied to the brake pedal 132 may be amplified by the brake booster 140, reducing the amount of force required by the vehicle operator 130 to depress the brake pedal 132. Alternatively or additionally, line 85 may supply other vacuum actuators.

In another embodiment, two adjustable valves 191 and 193 may be fluidly coupled to the brake booster 140. As shown in FIG. 1, valves 191 and 193 are arranged in a passage communicating with an air source (e.g., atmosphere). A first end of the passage is coupled to vacuum reservoir 184, and a second end of the passage may be coupled to the air source. Valve 191 is arranged proximal to vacuum reservoir 184, whereas valve 193 is arranged proximal to the air source. An additional passage may couple the other side of the brake booster (e.g., the opposite side of the brake booster from the vacuum reservoir) to the passage at a location between valves 191 and 193. Valves 191 and 193 be electrically controlled valves, and controller 12 may send a signals to independently change positions of the valves 191 and 193 from an open position (or a position of high flow) to a closed position (or a position of low flow), or vice versa, or any position there-between. When the brake pedal 132 is depressed, valve 193 may be opened and valve 191 may be closed, to allow air to enter the brake booster 140 on only one side of the diaphragm (e.g., the side that is not the vacuum reservoir), thereby amplifying the force provided by the vehicle operator 130. In contrast, valve 191 may be opened to decrease the braking force provided by the brake booster, such as when the vehicle operator releases the brake pedal 132. Opening valve 191 places the same air pressure on both sides of the diaphragm 183, causing no pneumatic force augmentation to the brake hydraulic master cylinder.

Vacuum reservoir 184 may receive vacuum from a valved aspirator system 59 and intake manifold 144. Valved aspirator system 59 may comprise aspirator 30, an aspirator shut-off valve (ASOV) 60, check valve 73, and check valve 56. In the depicted example, ASOV 60 and aspirator 30 are arranged in a conduit 137. A first end of conduit 137 is coupled to the intake passage upstream of the compressor, and a second end of conduit 137 is coupled to the engine intake downstream of the throttle (e.g., to the intake manifold as shown). The controller may send a signal to open ASOV 60 to divert a portion of intake air from upstream of compressor 14 into intake manifold 144 conduit 137, thereby generating vacuum at the suction inlet of aspirator 30 which may contribute to replenishment of vacuum in the brake booster vacuum reservoir. While flowing through conduit 137, the air may pass through aspirator 30, generating vacuum at the aspirator's suction inlet. As shown, aspirator 30 is arranged in conduit 137 such that a converging portion thereof is proximal to the first end of the conduit, whereas a diverging portion thereof is proximal to the second end of the conduit. A portion of intake air diverted through aspirator 30, and consequently an amount of vacuum generated at aspirator 30, may be controlled by the aspirator shut-off valve (ASOV) 60. The ASOV 60 may be an electrically-controlled valve such as a solenoid valve. Controller 12 may command a signal to change a position of the ASOV 60 from an open position (or a position of high flow) to a closed position (or a position of low flow), or vice versa, or any position there-between. Further, the check valve 56 coupled between the aspirator's suction inlet and the brake booster vacuum reservoir may prevent backflow of air from the suction inlet of the aspirator towards aspirator the brake booster vacuum reservoir. A vacuum level at in the brake booster vacuum reservoir may be measured by a pressure sensor 146 arranged therein, as shown in FIG. 1. As discussed in greater detail below with reference to FIG. 5, the ASOV may be opened to replenish the vacuum stored in the brake booster vacuum reservoir. For example, brake booster vacuum replenishment may be desired when the diaphragm 183 motion occurs or when valves 191 or 193 are opened.

Intake manifold 144 is configured to supply intake air or an air-fuel mixture to a plurality of combustion chambers of engine 10. The combustion chambers may be arranged above a lubricant-filled crankcase 114 (depicted schematically in FIG. 1), in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel, un-burned air, and exhaust gases may 'blow by' the piston rings and enter the crankcase over time. To reduce the degrading effects of the fuel (liquid or vapor) on the viscosity of the engine lubricant and to reduce the discharge of the vapor into the atmosphere, the crankcase may be continuously or periodically ventilated, as further described hereinafter. In the configuration shown in FIG. 1, PCV valve 28 (alternatively referred to herein as crankcase ventilation valve 28) controls the ventilation of crankcase gases into the intake manifold via crankcase ventilation line 80.

It will be appreciated that, as used herein, crankcase gas flow refers to the flow of fuel vapor and gases from the crankcase to the intake manifold along ventilation line 80. Similarly, as used herein, crankcase backflow refers to the flow of fuel vapors and gases along ventilation line 80 from the intake manifold to the crankcase. Backflow may occur when intake manifold pressure is higher than crankcase pressure (e.g., during boosted engine operation).

In one non-limiting example, PCV valve 28 may include a first orifice 143, a second orifice 145, and a third orifice 147. Each orifice serves to limit a flow rate of gasses passing therethrough, to an extent that is proportional to a size of the orifice. First orifice 143 may be larger than second orifice 145, which may in turn be larger than third orifice 147. Accordingly, allow a larger flow amount/higher flow rate of crankcase gasses may pass through the first orifice as compared to the second orifice, and a larger flow amount/ higher flow rate of crankcase gasses may pass through the second orifice as compared to the third orifice.

Crankcase ventilation valve 28 may additionally include a one-way check valve 149 positioned in parallel with third orifice 147. One-way check valve 149 allows flow from the crankcase towards the intake manifold and limits backflow from the intake manifold towards the crankcase. As such, any crankcase backflow from the intake manifold 144 to the crankcase 114 may be forced through third orifice 147. This may occur during conditions where a lower pressure exists in the crankcase 114 than in the intake manifold (also referred to herein as a negative manifold vacuum).

In the embodiment shown in FIG. 1, PCV 28 additionally includes a pneumatically-controlled valve 141 arranged in series with first orifice 143. The series arrangement of valve 141 and first orifice 143 is arranged in parallel with second orifice 145. Further, the parallel arrangement of valve 141 and first orifice 143 with second orifice 145 is arranged in series with the parallel arrangement of third orifice 147 with check valve 149.

In one example, valve 141 may include an internal restrictor (e.g., a cone or ball), and/or may be a spring-actuated valve. The position of the internal restrictor and thus the flow through the valve may be regulated by the pressure differential between the intake manifold and the crankcase. For example, when there is no vacuum in the intake manifold, for example during engine off conditions, a spring may keeps a base of the internal restrictor seated against an end of a housing of the valve which communicates with the crankcase, such that the valve is in a fully closed position. In contrast, when there is a high level of vacuum in the intake manifold, for example under engine idle or deceleration conditions, the internal restrictor moves upward within the valve housing towards the intake manifold end of the valve housing due to the increase in intake manifold vacuum. At this time, valve 141 is substantially closed. When intake manifold vacuum is at a lower level, for example during part-throttle operation, the internal restrictor moves closer to the crankcase end of the valve housing, and PCV flow moves through a larger annular opening between the internal restrictor and the valve housing. At this time, valve 141 is partially open. Finally, a further decrease in intake manifold vacuum (while intake manifold vacuum is still greater than zero), for example during high load conditions, moves the internal restrictor even closer to the crankcase end of the valve housing, such that PCV flow moves through an even larger annular opening between the internal restrictor and the valve housing. At this time, valve 141 is considered to be fully open, such that PCV flow through the valve is maximized. In this way, the opening state of valve 141 is influenced by manifold vacuum, and the flow rate through valve 141 is proportionate to manifold vacuum.

When the valve 141 is closed, gasses may still flow between the crankcase and the intake manifold through the second orifice during conditions where an electrically-controlled valve 153, which is described further below, is open. In the case of high manifold vacuum, valve 141 moves to a closed position, and gasses may flow from the crankcase to the intake manifold at a relatively low rate via the second orifice 145. This feature may limit crankcase ventilation flow during engine idle. In the case of low manifold vacuum, the spring actuated valve may open and allow a larger second amount of air to flow from the crankcase to the intake manifold. In this condition, the engine can accept the large air flow rate. Further, the larger second amount of air flow may be more proximate to a desired crankcase ventilation flow rate than the smaller first flow. Thus, under light engine loads, the valve may be closed, decreasing the amount of crankcase gasses flowing to the intake manifold.

The addition of valve 153 may allow for the upsizing of orifice 145. This may advantageously result in increased crankcase ventilation flow during high manifold vacuum conditions, which may in turn increases oil separation efficiency. The electrically-controlled valve 153 may be positioned between the parallel arrangement of third orifice 147 and one-way check valve 149 and the crankcase. Controller 12 may command a signal to change a position of the valve 153 from an open position (e.g., a position of high flow) to a closed position (e.g., a position of low flow or no flow), or vice versa, or any position there-between. In the closed position, the electrically-controlled valve may not allow fluid communication between the intake manifold 144 and the crankcase 114. For example, gases can only flow from the crankcase to the intake manifold when valve 153 is open. Similarly, valve 153 is positioned such that gases can only flow from the intake manifold to the crankcase during reverse flow conditions when valve 153 is open. Thus, when valve 153 is closed, the crankcase and the intake manifold are not in fluidic communication. As described in greater detail below with reference to the methods shown in FIGS. 3 and 4, the position of valve 153 and thus the flow of crankcase gasses to the intake manifold 144 may be adjusted by the controller based on a rate of purge gas flow into the intake, a rate of brake booster flow into the intake, a difference between a desired engine air flow rate and a measured/estimated current engine air flow rate, and a difference between a desired engine fuel flow rate and a measured/estimated engine fuel flow rate, among other factors. In the embodiment of PCV valve 28 shown in FIG. 1, electrically-controlled valve 153 is physically incorporated within the PCV valve 28, such that it is integrated in and integral to PCV valve 28. In other embodiments, however, electrically-controlled valve 153 may be coupled in ventilation line 80 external to PCV valve 28. For example, valve 153 may be positioned upstream of PCV valve 28 with reference to forward crankcase ventilation flow, between the crankcase 114 and the PCV valve 28, or downstream of PCV valve 28 with reference to forward crankcase ventilation flow, between the intake manifold and PCV valve 28.

In a further embodiment, the PCV valve 28 may not include a pneumatically-controlled valve (e.g., a variable pressure control valve). Instead, PCV valve 28 may only include one or more orifices, one or more one-way check valves, and an electrically-controlled valve such as valve 153. In such examples, the flow of crankcase gasses to the intake manifold may be regulated solely by the electrically-controlled valve 153 and the three orifices.

References herein to opening or closing the PCV valve may specifically refer to the opening and closing of the electrically-controlled valve (e.g., electrically-controlled valve 153) which is integrated in the PCV valve (or arranged in series with the PCV valve in other examples).

Crankcase 114 may include one or more oil separators 96 and 98 for separating oil from the crankcase vapors (or "blowby gas") before the vapors are purged to intake manifold 144. Oil separators 96 and 98 enable bidirectional crankcase ventilation, as described below. A pressure level in crankcase 114 may be determined by a pressure sensor 62 arranged in the crankcase.

When barometric pressure (BP) is greater than MAP (e.g., during non-boosted conditions), fresh air is drawn into crankcase 114 from downstream of air cleaner 33 and upstream of compressor 14 along vent tube 178. Crankcase fuel vapors and gases may then be vented from the crankcase to the intake manifold line in ventilation line 80 via electrically-controlled valve 153 and crankcase ventilation valve 28 when valve 153 is open. Under some engine operating conditions such as when MAP is greater than BP (e.g., during boosted conditions), and the pressure in the crankcase is greater than BP, the crankcase fuel vapors may be drawn along vent tube 178 (reverse flow). However, in such conditions, the controller may be configured to send a signal to actively shut valve 153 if reverse flow is not desired.

Engine system 100 further includes a fuel tank 26, which stores a volatile liquid fuel combusted in engine 10. To avoid emission of fuel vapors from the fuel tank and into the atmosphere, the fuel tank is vented to the atmosphere through adsorbent canister 22. The adsorbent canister may have a significant capacity for storing hydrocarbon, alcohol, and/or ester-based fuels in an adsorbed state; it may be filled with activated carbon granules and/or another high surface-area material, for example. Nevertheless, prolonged adsorption of fuel vapor may eventually reduce the capacity of the adsorbent canister for further storage. Therefore, the adsorbent canister may be periodically purged of adsorbed fuel, as further described hereinafter. In the configuration shown in FIG. 1, a state of a solenoid 118 integrated in a CPV 126 may be controlled by the controller to control the purging of fuel vapors from the canister into the intake manifold along purge line 82. As shown, CPV 126 is arranged in purge line 82, and purge line 82 is coupled to the canister at a first end thereof, and to the intake manifold at a second end thereof. Check valve 52 coupled in purge line 82 prevents backflow from intake manifold 144 into canister 22.

As shown in FIG. 1, CPV 126 comprises a series arrangement of solenoid 118 and a flow restriction 119. The flow restriction 119 serves to restrict the flow of purge vapors from the canister 22 to a flow level that is below a predetermined threshold. The combination of solenoid 118 and flow restriction 119 results in a valve that is sometimes referred to as a sonic valve, which operates as a low pressure air and fuel injector. Said another way, the flow restriction 119 may prevent flow from canister 22 at a level which exceeds the predetermined threshold.

Solenoid 118 of CPV 126 may be a continually adjustable valve, and may be duty cycled (e.g., at 10 Hz). The fraction of time that it is open and the pressure drop across it may determine the total molar flow across the CPV. For example, small duty cycle may be used at low engine flow rates or high canister purge loadings. With a loaded canister, the first portion of molar flow rate has a high concentration of fuel. As the canister fuel loading level drops, the fuel concentration drops and the valve opens more (increased duty cycle) to allow approximately the same fuel flow rate through. With a full canister, it is the fuel rate that limits CPV duty cycle. With a nearly empty canister, it is the air flow rate that limits CPV duty cycle.

When purging conditions are met, such as when the canister is saturated, the measured engine air flow rate is below a desired engine air flow rate, and the measured engine fuel flow rate is below a desired engine fuel flow rate (as discussed in greater detail with reference below to FIGS. 3 and 4), vapors stored in fuel vapor canister 22 may be purged to intake manifold 144 by actively opening solenoid 118. When CPV 126 is open, fuel vapors may be drawn from the canister into the intake manifold 144 via two pathways. First, fuel vapors may be drawn from canister 22 along purge line 82 directly into the intake manifold 144 (e.g., into the intake system downstream of the throttle) due to the presence of intake manifold vacuum. For example, purge vapor flow to the intake manifold 144 along line 82 may occur during conditions when BP>MAP (e.g., during non-boosted conditions) and where the CPV is at least partially open. Purge fuel vapors may also flow indirectly to the intake manifold 144 along a purge line 83. As shown, a first end of purge line 83 may be coupled to purge line 82 downstream of CPV 126 and upstream of the intake manifold, and a second end of purge line 83 may be coupled to the suction inlet of ejector 116. When TIP>BP (e.g., during boosted conditions), motive flow traveling through ejector 116 from the intake passage downstream of the compressor to the intake passage upstream of the compressor may induce a suction flow of fuel vapors from canister 22 into the suction port of the ejector, then into the intake passage 142 upstream of the compressor. The fuel vapors may then flow into the intake manifold 144 by way of intake passage 142. One-way check valve 115 coupled in purge line 83 may prevent the motive flow traveling through the ejector from entering purge line 83 via the suction port. Accordingly, both crankcase gas and fuel vapor purge flows into the intake manifold can be controlled independently.

As shown, a vapor blocking valve (VBV) 124 may be optionally included in a conduit between fuel tank 26 and canister 22. VBV 124 may alternatively be referred to as a fuel tank isolation valve. In some embodiments, VBV 124 may be a solenoid valve, and operation of VBV 124 may be regulated by adjusting a driving signal (or pulse width) of the dedicated solenoid. During normal engine operation, VBV 124 may be kept closed to limit the amount of fuel tank vapor directed to canister 22 from fuel tank 26. During refueling operations, and selected purging conditions, VBV 124 may be opened to direct fuel vapors from the fuel tank 26 to canister 22. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the isolation valve may be mounted on fuel tank 26.

As shown, a fuel tank pressure transducer 163 may be arranged in the line coupling fuel tank 26 with VBV 124. Fuel tank pressure transducer 163 may measure a pressure level in fuel tank 26 and provide a signal with this information to the control system.

Further, as shown, a vent 117 may be coupled to canister 22 for routing gases out of the canister to the atmosphere when storing, or trapping, fuel vapors from fuel tank 26. Vent 117 may also allow fresh air to be drawn into fuel vapor canister 22 when purging stored fuel vapors to intake manifold 144 via purge line 82 and CPV 126. While this example shows vent 117 communicating with fresh, unheated air, various modifications may also be used. Vent 117 may include a canister vent valve 120 arranged therein to adjust a flow of air and vapors between canister 22 and the atmosphere. While a single canister 22 is shown, it will be appreciated that any number of canisters may be coupled in engine system 100.

Controller 12 may be configured as a microcomputer including a microprocessor unit, input/output ports, an electronic storage medium for executable programs and calibration values, random access memory, keep alive memory, and a data bus. Controller 12 may receive various signals from sensors 16 coupled to engine 10 such as MAF sensor 58, MAP sensor 162, crankcase ventilation pressure sensor 62, CIP sensor 160, TIP sensor 161, brake booster pressure sensor 146, etc. Furthermore, controller 12 may monitor and adjust the position of various actuators 81 based on input received from the various sensors. These actuators may include, for example, throttle 20, intake and exhaust valve systems, CPV 126, canister vent valve 120, crankcase ventilation valve 28, ASOV 60, and compressor 14. Storage medium read-only memory in controller 12 can be programmed with computer readable data representing instructions executable by a processor for performing the methods described below, as well as other variants that are anticipated but not specifically listed. Example methods and routines are described herein with reference to FIGS. 3 and 4.

Figure 2:
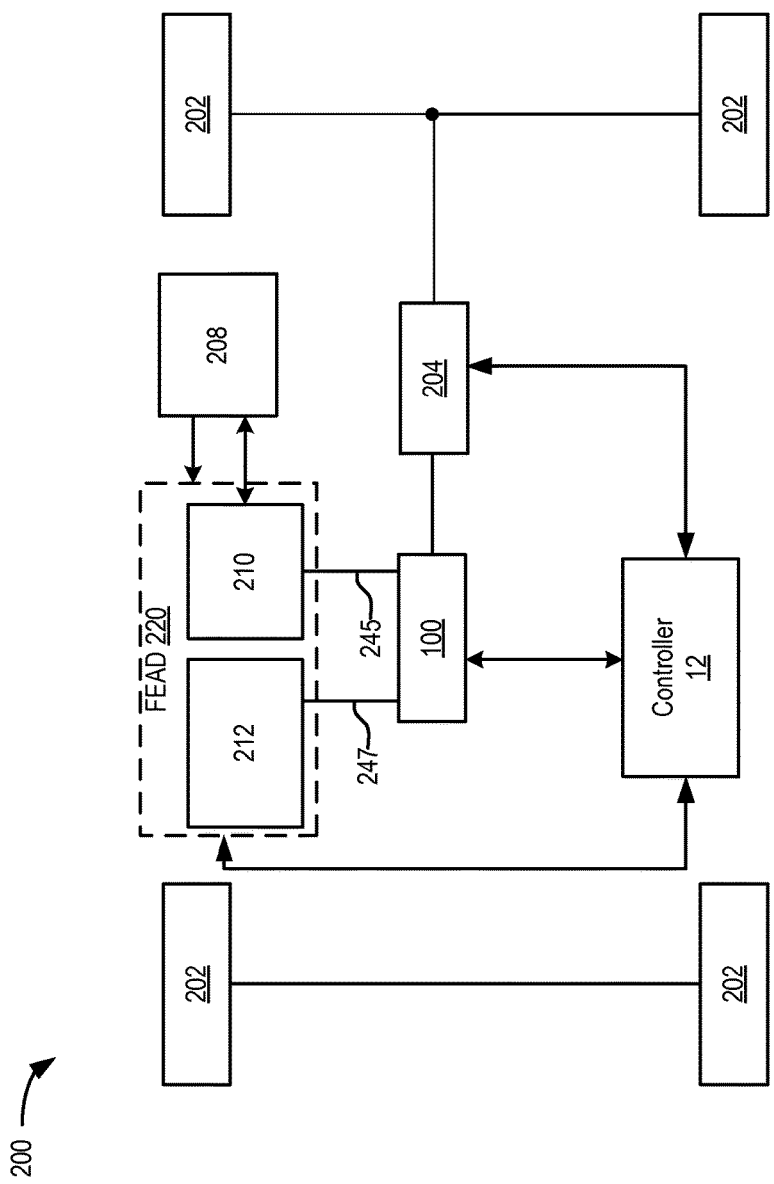
FIG. 2 is a schematic diagram of an example vehicle system comprising the engine system of FIG. 1.

Referring now to FIG. 2, a vehicle system 200 is schematically shown. Vehicle system 200 includes an engine system 100, which may correspond to engine system 100 of FIG. 1. The vehicle system includes wheels 202. Torque is supplied to wheels 202 via engine system 100 and a transmission 204. In some examples, an electric motor or hydraulic motor may also provide torque to wheels 102. As shown, front end accessory drive (FEAD) 220 may include an alternator 210 and an air conditioning (A/C) compressor 212. Alternator 210 and A/C compressor 212 may each be mechanically coupled to engine system 100 via a respective shaft or pulley 245, 247. Alternatively, alternator 210 and A/C compressor 212 may be mechanically coupled to engine system 100 via a common shaft or pulley. Battery 208 and alternator 210 may provide electrical power to various engine accessory components not shown in FIG. 2. Controller 12 may correspond to controller 12 described above with reference to FIG. 1, and may include instructions stored in non-transitory memory for controlling and receiving inputs from alternator 210, A/C compressor 212, engine system 100, and transmission 204.

Figure 3:
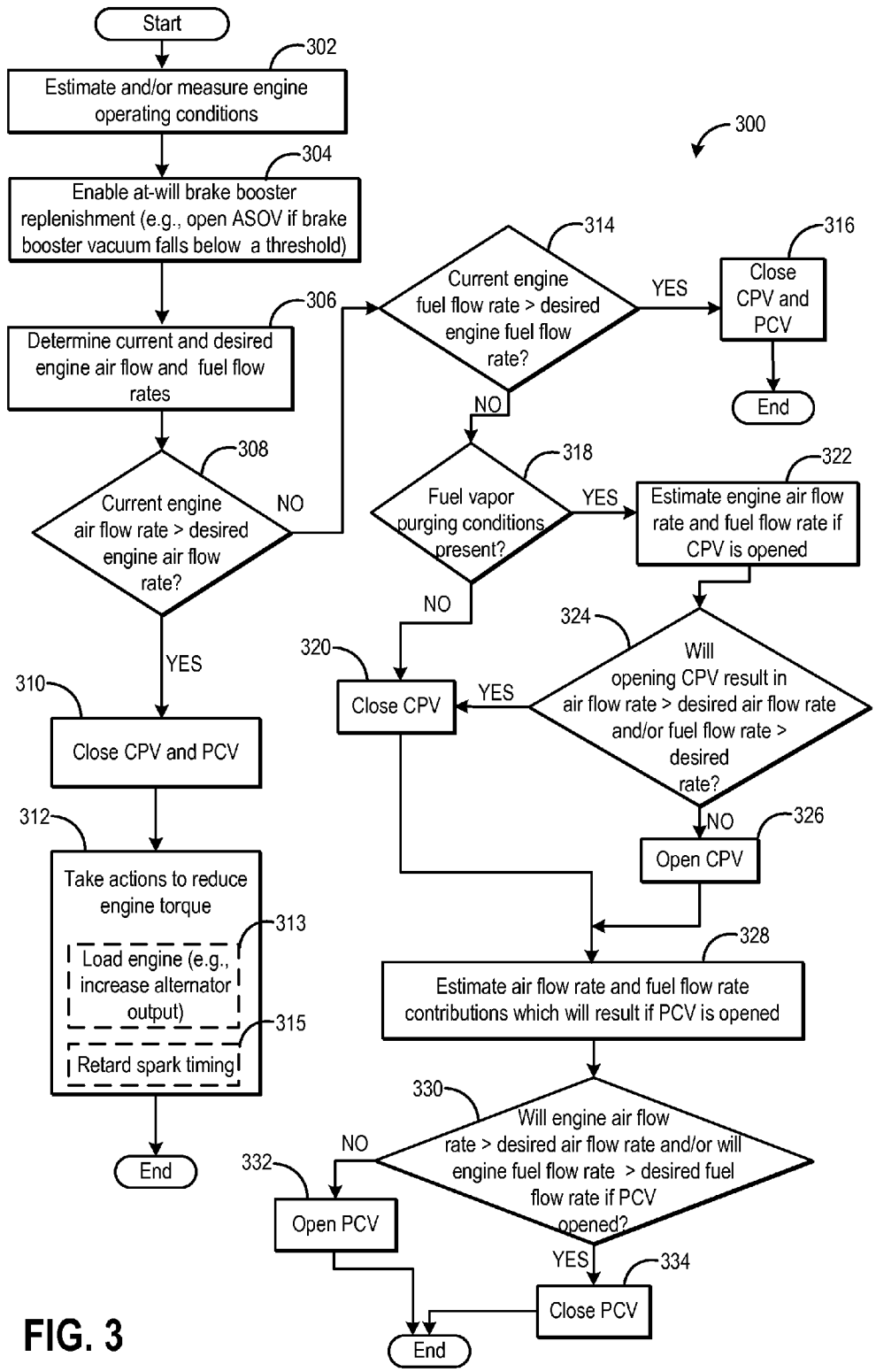
FIGS. 3-4 are flow charts of two methods for regulating brake booster, fuel vapor purge, and crankcase ventilation flows to an engine intake downstream of a throttle.
Figure 4:
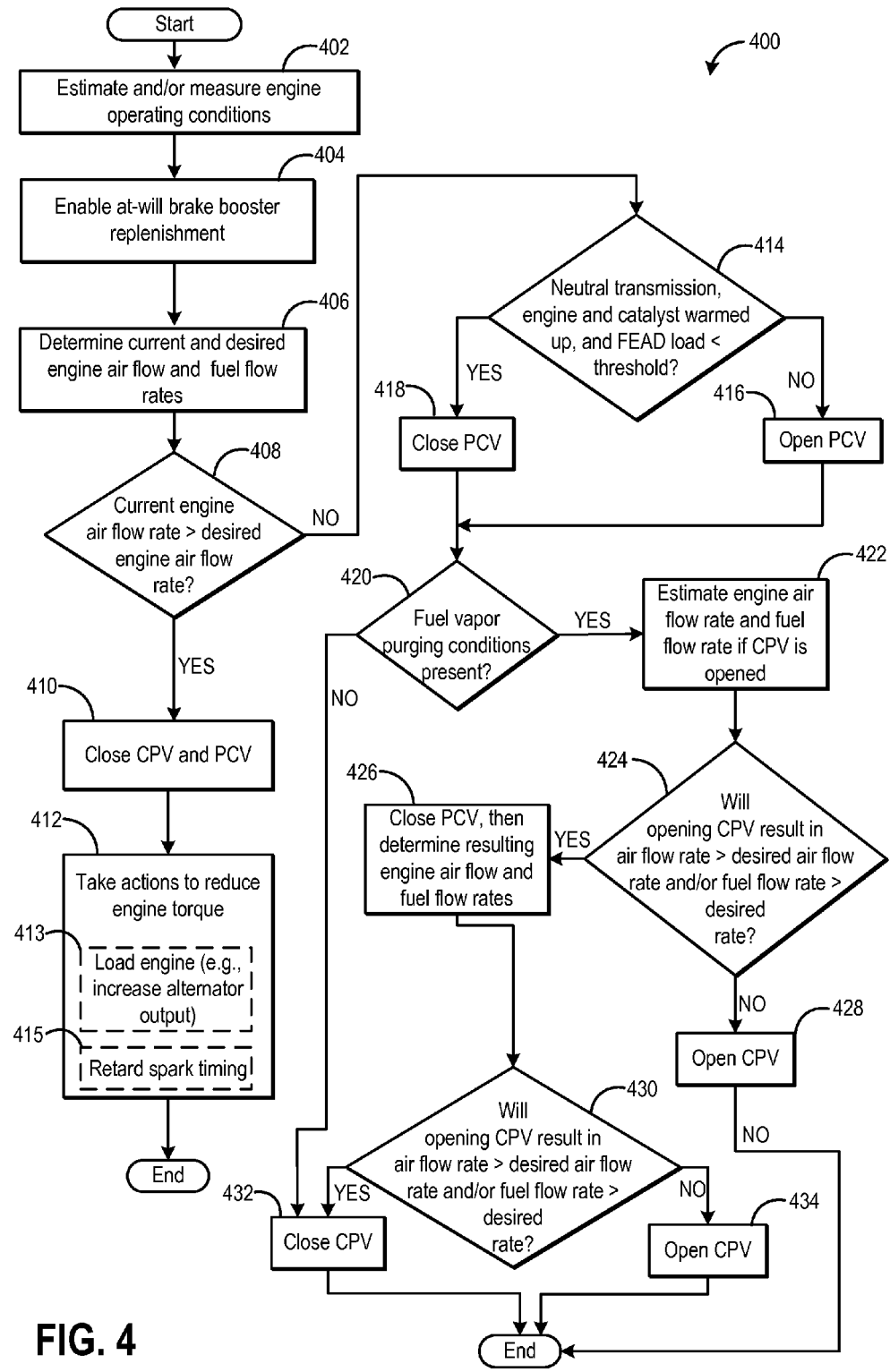

Turning now to FIGS. 3 and 4, two methods are shown for coordinating brake booster, positive crankcase ventilation (PCV), and canister purge flows into an intake manifold (e.g., intake manifold 144 of FIG. 1). As discussed above with reference to FIG. 1, the brake booster, PCV, and canister purge flows may flow into the intake manifold via separate and distinct flow paths. For example, canister purge vapors may enter the intake manifold via a first conduit (e.g., purge line 82), crankcase gases via a second conduit (e.g., crankcase ventilation line 80), and brake booster flow via a third conduit (e.g., brake booster vacuum line 85). Canister purge vapors may also enter the intake manifold via a fourth conduit (e.g., purge line 83) via a vacuum generated at an ejector (e.g., ejector 116). The vacuum generated at the ejector and the resulting flow of purge vapors through the fourth conduit may be dictated by the pressure drop across a turbocharger compressor (e.g., compressor 14) in the intake passage. The positions of a canister purge valve (e.g., CPV 126) arranged in the first conduit, and a PCV valve (e.g., PCV valve 28) arranged in the second conduit may each be independently adjusted by a controller (e.g., controller 12) to regulate the purge and PCV flows. Canister purge and PCV flows may thus be independently regulated by adjusting the position of electrically-controlled valves placed in the first and second conduits. As such, the opening and closing of the PCV valve and canister purge valve (CPV) may be controlled by the controller. The PCV valve may be opened or closed by adjusting the position of an electrically-controlled valve (e.g., electrically-controlled valve 153). The intake manifold may receive a flow from the brake booster (e.g., brake booster 140) which happens passively when the pressure in the intake manifold is less than the pressure in the brake booster, as explained above with reference to FIG. 1. However, the controller may also induce additional brake booster flow to the intake manifold by adjusting the position of ASOV 60, thereby creating an additional vacuum source at the aspirator (e.g., aspirator 30) for evacuating the brake booster. The methods described may be stored in a memory of an engine controller such as controller 12 shown in FIG. 1, for regulating PCV, canister purge, and brake booster flows into the intake manifold.

FIG. 3 shows a method 300 for regulating PCV, canister purge, and brake booster flows into the intake manifold. Instructions for carrying out method 300 may be stored in the memory of an engine controller (e.g., controller 12). Further, method 300 may be executed by the controller.

At 302 of method 300, the controller estimates and/or measures engine operating conditions. Engine operating conditions may include, engine speed and load, engine air flow rate, engine fuel flow rate, MAP, TIP, CIP, a position of the PCV valve, a position of the CPV, etc. After estimating engine operating conditions, the method proceeds to 304 to enable at-will brake booster replenishment. At-will brake booster replenishment may include the controller sending a signal to an actuator to open the ASOV whenever the vacuum in the brake booster drops below a threshold level. For example, if the pressure in the brake booster increases above a threshold pressure, then the ASOV may be opened to decrease the amount of pressure/increase the level of vacuum in the brake booster.

Brake booster vacuum may decrease as a result of user input. For example, when a vehicle operator (e.g., vehicle operator 130) moves a brake pedal (e.g., input device 132), it may be desirable to replenish the brake booster, and as such, the controller may open the ASOV. Thus, brake booster replenishment may be controlled by the controller based on input from a vehicle operator via the brake pedal, and may further be based on the level of pressure/vacuum in the brake booster.

After 304, the controller may continue to 306 to determine the current and desired engine air flow and fuel flow rates. The controller may estimate the current air and fuel flow rates based on outputs of various sensors and actuators. For example, the controller may estimate the air flow rate based on outputs from a mass air flow sensor (e.g., mass air flow sensor 58) positioned in the air intake system (e.g., intake passage 142), a CIP sensor (e.g., CIP sensor 160), a TIP sensor (e.g., TIP sensor 161), and a position of a throttle (e.g., throttle 20). Additionally, the controller may estimate the air flow rate by taking into account flows into the intake manifold that bypass the throttle such as gasses from a brake booster (e.g., brake booster 140), a purge canister (e.g., canister 22), and a crankcase (e.g., crankcase 114). Further, the controller may estimate the fuel flow rate based on engine speed, injector commands, injection pressure, the estimated fuel rate within canister purge flow rate, the estimated fuel flow rate within the PCV flow rate. The desired engine air flow and fuel flow rates may be based on input from the vehicle operator. Alternatively, the desired air flow rate and fuel flow rate may be based on a need to idle the engine such as a commanded idle speed.

After estimating the current and desired air and fuel flow rates at 306, method 300 proceeds to 308, and the controller determines if the current engine air flow rate is greater than the desired engine air flow rate. If the current engine air flow rate is greater than the desired engine air flow rate, then the controller continues to 310 to close the CPV and the PCV valve. Closing the CPV and the PCV valve may involve moving the valves towards a closed position so that canister purge gasses and crankcase gasses do not flow into the intake manifold. If the CPV or PCV valves are already closed at 310, the controller may maintain the position of the valve in a closed position at 310. It will be appreciated that references to the air flow rate being greater than desired herein refer to air flow rate after the engine intake throttle has already been commanded to its minimum position.

Subsequently at 312, the controller may take actions to reduce engine torque. To reduce net engine brake torque, the controller may load the engine by increasing alternator torque at 313, and/or by retarding spark timing at 315. Step 313 stores energy in the battery, thus increasing torque consumption, whereas step 315 results in delivery of heat into the exhaust, thus reducing torque production. For example, retarding spark timing may include retarding spark timing from a nominal spark timing, the nominal spark timing set during the compression stroke of the engine to provide maximum fuel efficiency. As such, retarding the spark timing may reduce the efficiency of the engine (e.g., engine 10) and decrease the power output by the engine. Increasing alternator torque may include increasing a voltage and/or current applied to the alternator, thereby increasing the load applied to the engine by the alternator. In one example, the controller at 312 may only execute 313 and increase alternator torque, and may not proceed to 315 and retard spark timing. In another example, the controller at 312 may only proceed to 315 and retard spark timing, and may not proceed to 315 and increase alternator torque. In a further example, the controller at 312 may proceed to both 313 and 315 and increase alternator torque and retard spark timing. The controller may carry out 313 and 315 simultaneously, or may execute one before the other. After 312, method 300 ends.

Returning to 308, if the controller determines that the current engine air flow rate is not greater than the desired engine air flow rate, the controller may proceed to 314 and determine if the current engine fuel flow rate is greater than the desired engine fuel flow rate. If the current engine fuel flow rate is greater than the desired engine fuel flow rate, then the controller may continue to 316 and close the CPV and PCV valve. Closing the PCV valve may include adjusting the position of the electrically-controlled valve (e.g., electrically-controlled valve 153) towards a more closed position that decreases the cross-sectional area through which crankcase gasses may flow. In one embodiment, closing the PCV valve may provide a fluid seal between the crankcase and the intake manifold that inhibits the flow of gasses there-between.

However, if the controller determines that the current engine fuel flow rate is less than the desired engine fuel flow rate at 314, the controller may continue to 318 and determine if fuel vapor purging conditions are present. The controller may determine if fuel vapor purging conditions are present based on concentration of fuel vapor in the fuel vapor canister/measured pressure level in the fuel vapor canister, as well as based on the current pressures in the fuel vapor canister and the intake manifold. For example, if the fuel vapor concentration in the fuel vapor canister is greater than a threshold concentration, then fuel vapor purging conditions may be present. The threshold concentration may be a known fuel vapor concentration stored in the memory of the controller. In one example, the threshold fuel vapor concentration may be twenty percent. Said another way, fuel vapor purging conditions may be present if one or more of the following conditions are present: fuel vapor concentration in the fuel vapor canister exceeds a threshold concentration; and the pressure in the intake manifold is less than the pressure in the fuel vapor canister by more than a threshold amount. With regard to the latter condition, the controller may determine if the pressure in the intake manifold is lower than the pressure in the fuel vapor canister by more than a threshold. The threshold pressure difference may be a pressure difference between the fuel vapor canister and the intake manifold sufficient to induce the flow of canister purge gasses upon opening of the CPV.

If fuel vapor purging conditions are not present at 318, the controller may close the CPV at 320. In one example, closing the CPV may include adjusting the position of the CPV to a closed position, thereby sealing an opening of the valve such that crankcase gasses may not flow through the valve. In another example, closing the CPV may include decreasing the size of the opening of the valve from the current position to a position between the current position and the closed first position, and thus decreasing the flow of crankcase gasses through the valve.

However, if fuel vapor purging conditions are present at 318, then the controller may continue to 322 and estimate the engine air flow rate and fuel flow rate that will result if the CPV is opened. The controller may estimate what the air flow rate and fuel flow rate in the intake manifold would be upon opening the CPV based on an estimated concentration of fuel vapor in the fuel vapor canister, and an estimated flow rate of the purge vapors (which may be based on the amount of vacuum present at the ejector and the intake manifold). For example, increases in the concentration of fuel vapor in the fuel vapor canister, and increases in the vacuum present at the intake manifold, may increase the fuel flow rate to the intake manifold upon opening of the CPV. After estimating what the engine air flow rate and fuel flow rate would be if the PCV is opened, the controller may continue to 324 and determine if opening the CPV would result in the air flow rate being greater than the desired air flow rate and/or the fuel flow rate being greater the desired fuel flow rate. If opening the CPV would result in one or more of the air flow rate and fuel flow rate being greater than desired, then the controller may proceed to 320 and close the CPV. However, if the controller determines that opening the CPV valve would not increase the air flow rate and fuel flow rate past their desired rates, then the controller may open the CPV at 326. Opening the CPV may comprise adjusting the position of the CPV towards a more open position that increases the cross sectional area through which canister purge gasses may flow. Said another way, the controller may increase the opening amount of the CPV to increase the amount of canister purge gasses flowing from the purge canister to the intake manifold (either directly in a purge line such as purge line 82, or indirectly by flowing in a purge line such as purge line 83 leading to an ejector suction inlet, a motive outlet of the ejector leading to the engine intake passage upstream of the compressor).

After either closing the CPV at 320, or opening the CPV at 326, the controller may continue to 328 and estimate the air flow rate and fuel rate contributions which would result if the PCV valve were opened. An estimate of the contributions of crankcase gasses to the air flow rate and fuel flow rate that would result upon opening of the PCV valve may be based on the difference in pressure between MAP and the pressure in the crankcase, among other factors. In one example, a model of the blowby gas entering the crankcase, the fresh air entering the crankcase, and the mixed effluent exiting the crankcase may be used to estimate the amount of air in the gases exiting the crankcase. For example, such a model may be stored in memory of the control system, and the controller may estimate the amount of air in the gases exiting the crankcase by populating the model with current operating parameter values. Total molar gas flow rate may be computed by the controller based on crankcase pressure, intake manifold pressure, and valve position.

After 328, method 300 may proceed to 330, and the controller may determine if the engine air flow rate would be greater than the desired air flow rate and/or if the engine fuel flow rate would be greater than the desired fuel flow rate if the PCV valve were opened. The controller may estimate what the air flow rate and fuel flow rate would be if the PCV were opened based on the canister purge flow, brake booster flow, mass air flow in the intake passage, the pressure drop across the turbocharger, the position of the throttle, etc. For example, increases in brake booster replenishment flow may result in increases in the engine air flow rate, and similarly increases in the purge flow may result in increases in the engine fuel flow rate.

If the controller determines that one or more of the engine air flow rate and fuel flow rate would be greater than desired upon opening of the PCV valve, then the controller may proceed to 334 to close the PCV valve. In one example, closing the PCV valve may include adjusting the position of the electrically-controlled valve integrated in the PCV valve (e.g., electrically-controlled valve 153) to a closed position, whereby an opening of the valve may be sealed, such that crankcase gasses may not flow through the valve. In another example, closing the PCV valve may include decreasing the size of the opening of the electrically-controlled valve from the current position to a position between the current position and the closed first position, and thus decreasing the flow of crankcase gasses through the valve. After 334, method 300 ends.

However, if the controller determines that opening the PCV valve would not increase the engine air flow rate or fuel flow rate past their desired levels, then the controller may open the PCV valve at 332. Opening the PCV valve may involve adjusting the position of the valve towards a more open position that increases the cross-sectional area through which crankcase gasses may flow. After 332, method 300 ends.

Thus, in accordance with method 300, a method for an engine may include electrically controlling a crankcase ventilation valve to selectively enable crankcase ventilation flow into an engine intake downstream of a throttle based on desired engine air and fuel flow rates, current engine air flow rate contributions from a brake booster, and current engine air and fuel flow rate contributions from a fuel vapor purge system. If the current engine air flow rate contributions from the brake booster exceed the desired engine air flow rate, the method may further include electrically controlling the crankcase ventilation valve to disable crankcase ventilation flow into the engine intake, and electrically controlling a canister purge valve to disable flow from the fuel vapor purge system into the engine intake. If the current engine air flow rate contributions from the brake booster do not exceed the desired engine air flow rate, and if fuel vapor purging conditions are present, the method may also include electrically controlling the canister purge valve to enable flow from the fuel vapor purge system into the engine intake if estimated engine air and fuel flow rates with fuel vapor purge flow enabled do not exceed the desired engine air and fuel flow rates, respectively. If the current engine air flow rate contributions from the brake booster do not exceed the desired engine air flow rate, and if fuel vapor purging conditions are present, the method may include electrically controlling the crankcase ventilation valve to enable crankcase ventilation flow into the engine intake if estimated engine air and fuel flow rates with both fuel vapor purge flow and crankcase ventilation flow enabled do not exceed the desired engine air and fuel flow rates, respectively. In addition, if the current engine air flow rate contributions from the brake booster do not exceed the desired engine air flow rate, and if fuel vapor purging conditions are not present, the method may include electrically controlling the canister purge valve to disable flow from the fuel vapor purge system into the engine intake and electrically controlling the crankcase ventilation valve to enable crankcase ventilation flow into the engine intake if estimated engine air and fuel flow rates with fuel vapor purge flow disabled and crankcase ventilation flow enabled do not exceed the desired engine air and fuel flow rates, respectively. The method may further include taking actions to reduce engine torque if the current engine air flow rate contributions from the brake booster exceed the desired engine air flow rate. Electrically controlling the crankcase ventilation valve in accordance with method 300 may include controlling a solenoid valve integrated in the crankcase ventilation valve, as described herein.

FIG. 4 shows another example method 400 for regulating PCV, canister purge, and brake booster flows to the intake manifold. Instructions for carrying out method 400 may be stored in the memory of an engine controller (e.g., controller 12). Further, method 400 may be executed by the controller.

Method 400 begins at 402 and the controller estimates and/or measures engine operating conditions. Engine operating conditions may include, engine speed and load, intake mass air flow, fuel flow rate, MAP, TIP, CIP, a position of the solenoid of the PCV valve, a position of the CPV, etc. After estimating engine operating conditions, the controller may proceed to 404 and enable at-will brake booster replenishment. At-will brake booster replenishment may include opening the ASOV whenever the vacuum in the brake booster drops below a threshold level. For example, if the pressure in the brake booster increases past a threshold pressure, then the ASOV may be opened to decrease the amount of pressure (increase vacuum) in the brake booster. Brake booster vacuum may decrease as a result of user input. For example, when a vehicle operator (e.g., vehicle operator 130) releases a brake pedal (e.g., input device 132), brake booster replenishment may be desired, and as such, the controller may open the ASOV. Thus, brake booster replenishment may be controlled by the controller based on input from a vehicle operator via the brake pedal, and the level of pressure/vacuum in the brake booster.

After 404, the controller may continue to 406 and determine the current and desired engine air flow and fuel flow rates, for example in the manner described with respect to step 306 of method 300. After estimating the current and desired air and fuel flow rates at 406, method 400 may proceed to 408, and the controller may determine if the current air flow rate is greater than the desired engine air flow rate, for example in the manner described above for step 308 of method 300. If the current air flow rate is greater than the desired engine air flow rate, then the controller may continue to 410 and close the CPV and the PCV valve. Closing the CPV and the PCV valve may involve moving each of the valves towards a closed position so that canister purge gasses and crankcase gasses are not flowing to the intake manifold. If the CPV or the PCV valve is already closed at 410, the controller may maintain the position of the valve in a closed position at 410.

Subsequently at 412, and optionally at 413 and/or 415, the controller may take actions to reduce engine torque, for example in the manner described above for step 312 of method 300. After 412, method 400 ends.

Returning to 408, if the controller determines that the current engine air flow rate is not greater than the desired engine air flow rate, then method 400 may continue to 414, and the controller may determine if the vehicle (e.g., vehicle 200) is in neutral transmission, with the engine and catalyst warmed up, and with a FEAD load less than a threshold. The threshold load for the FEAD may be a predetermined load amount that may be stored in the memory of the controller. Further, the threshold FEAD load may be based on the engine air flow rate, where the threshold load may be set to a level at which the engine is operable at a minimum first air flow rate with the threshold FEAD load amount. The controller may determine that the vehicle is in neutral transmission if the transmission (e.g., transmission 204) is not converting torque from the engine to deliver to the vehicle wheels. The catalyst and engine may be determined to be warmed up based on engine operating conditions (e.g., engine temperature, duration of engine use, number of engine cycles, etc.). For example, if the temperature of the engine is greater than a threshold, and/or the engine has been running longer than a threshold amount of time, and/or an emissions level measured downstream of the catalyst is below a threshold level, then the controller may determine that the engine and catalyst are warmed up.

If the controller determines that the transmission is in neutral, the engine and catalyst are warmed up, and the FEAD load is less than a threshold, then the controller may continue to 418 and close the PCV valve, for example in the manner described above for step 334 of method 300. If the PCV valve is already closed at 418, the controller may maintain the position of the PCV valve in the closed first position at 418.

If the controller determines that either the vehicle transmission is not in neutral, or the engine and catalyst are not warmed up, or the FEAD load is greater than a threshold, then the controller may proceed to 416 and open the PCV valve, for example in the manner described above for step 332 of method 300. After either closing the PCV valve at 418, or opening the PCV valve at 416, method 400 may then proceed to 420, and the controller may determine if fuel vapor purging conditions are present, for example in the manner described above for step 318 of method 300.

If it is determined at 420 that fuel vapor purging conditions are not present, the controller may continue to 432 and close the CPV, for example in the manner described above for step 320 of method 300. If the CPV is already closed at 432, the controller may maintain the position of the CPV in the closed first position at 432. After 432, method 400 ends.

Otherwise, if the controller determines at 420 that fuel vapor purging conditions are present, then the controller may subsequently estimate what the engine air flow rate and fuel flow rate would be if the CPV is opened at 422, for example in the manner described above for step 322 of method 300.

After estimating what the engine air flow rate and fuel flow rate would be if the CPV is opened, the controller may continue to 424 and determine if opening the CPV would result in the air flow rate being greater than the desired air flow rate and/or the fuel flow rate being greater the desired fuel flow rate. If the controller determines that opening the CPV valve would not increase the air flow rate and fuel flow rate past their desired rates at 424, then the controller may subsequently open the CPV at 428, for example in the manner described for step 326 of method 300. After 428, method 400 ends.

However, if opening the CPV would result in one or more of the air flow rate and fuel flow rate to exceed their desired respective rates, then the controller may proceed to 426 and close the PCV valve and then determine the resulting engine air flow and fuel flow rates. For example, at 424, the PCV valve may be open (e.g., if the determination at 414 is negative). If opening the CPV would cause either the air or fuel flow rates to exceed their desired rates (e.g., due to the air/fuel flow contributions from the PCV flow entering the intake manifold), then the PCV valve may be closed in order to prioritize fuel vapor purging over crankcase ventilation. After closing the PCV valve, the controller may determine the resulting engine air flow and fuel flow rates.

Subsequently at 430, the controller may determine if opening the CPV would result in the air flow rate being greater than the desired air flow rate and/or the fuel flow rate being greater the desired fuel flow rate. If the controller determines that opening the CPV valve would not increase the air flow rate and fuel flow rate past their desired rates at 430, then the controller may subsequently open the CPV at 434, for example in the manner described for step 326 of method 300. However, if opening the CPV would result in one or more of the air flow rate and fuel flow rate to exceed their desired respective rates, then the controller may proceed to 432 and close the CPV, for example in the manner described for step 320 of method 300. If the CPV is already closed at 430, then the controller may maintain the closed position of the CPV at 432.

Accordingly, in accordance with method 400, if an engine transmission is in neutral, the engine and an exhaust catalyst are warmed up, and a front end accessory drive load is below a threshold, an electrically-controlled crankcase ventilation valve may be closed to disable crankcase ventilation flow into an intake downstream of a throttle. Otherwise, the crankcase ventilation valve may be opened. When brake booster replenishment is requested, the crankcase ventilation valve may be closed if the engine air flow rate during brake booster replenishment with the crankcase ventilation valve open will exceed a desired engine air flow rate. When brake booster replenishment and fuel vapor purging are requested, fuel vapor purging may be delayed by maintaining a canister purge valve in a closed position if the engine air flow rate during brake booster replenishment with the canister purge valve open and the crankcase ventilation valve closed will exceed the desired engine air flow rate. However, the crankcase ventilation valve may be opened during simultaneous brake booster replenishment and fuel vapor purging if the engine air flow rate during the simultaneous brake booster replenishment and fuel vapor purging with the crankcase ventilation valve open will not exceed the desired engine air flow rate. It will be appreciated that during brake booster replenishment, an electrically-controlled shut-off valve arranged in series with an aspirator may be opened, the aspirator having a motive inlet coupled to the intake upstream of a turbocharger compressor, a motive outlet coupled to the intake downstream of the throttle, and a suction inlet coupled to a vacuum reservoir of the brake booster. Further, the crankcase ventilation valve may be closed during simultaneous brake booster replenishment and fuel vapor purging if an engine fuel flow rate during the simultaneous brake booster replenishment and fuel vapor purging with the crankcase ventilation valve open will exceed a desired engine fuel flow rate.

In accordance with methods 300 and 400, the minimum PCV flow rate may be upsized relative to PCV flow rate in systems utilizing traditional PCV control strategies. Thus, when the engine is at its minimum air flow rate condition, the PCV valve is closed, as an open PCV valve would cause the target air flow rate to be exceeded during this condition. Whereas former systems assumed that the three flows (PCV flow, fuel vapor purge flow, and aspirator flow) had to all co-exist continuously and concurrently, enabling the PCM to control all of these flows, as in methods 300 and 400, provides other options. Further, such control allows for upsizing of the PCV minimum flow rate, thus gaining an increase in oil separation. Oil separation advantageously keeps the engine oil in the crankcase, instead of losing it to engine combustion.

During engine idle conditions, PCM control of fuel sources as in methods 300 and 400 may advantageously help to ensure a minimum fuel flow. For example, more fuel flow rate than desired may be obtained from the fuel vapor storage canister, and when ethanol is flashing out of the engine oil, more fuel flow rate than desired may be obtained from the crankcase ventilation system. Fuel injectors have a minimum fuel mass that they can meter with accuracy, and this fact tends to limit the extent to which fuel delivered by the injector may be reduced.

Figure 5:
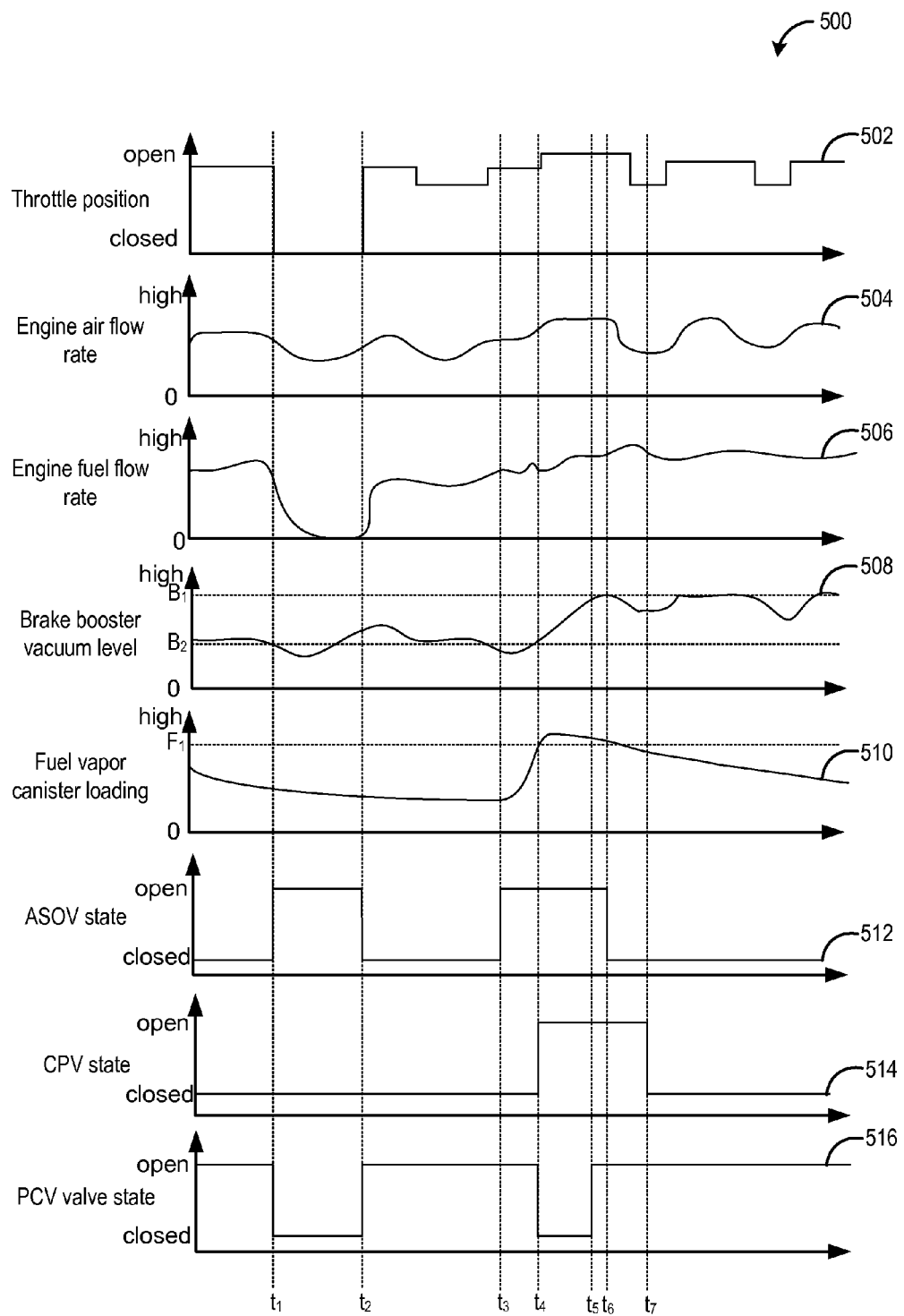
FIG. 5 is a graph illustrating changes in the position of an aspirator shut-off valve, canister purge valve, and PCV valve under varying engine operating conditions.

Turning now to FIG. 5, a graph illustrating how an ASOV, a CPV, and a PCV valve may be adjusted under varying engine conditions is shown. Specifically, a graph 500 shows changes in engine air flow at plot 504, and engine fuel flow at plot 506 as a result of changes in a throttle position at plot 502. The position of the throttle may be adjusted by a controller (e.g., controller 12), between a closed and an open position. Thus, the throttle may be adjusted from a closed first position to an open second position or any position therebetween. Adjusting the throttle to a more open position may increase the amount of air flow to the intake manifold. As discussed above with reference to FIGS. 3 and 4, the engine air flow rate may be measured by a mass air flow sensor (e.g., mass air flow sensor 58). The engine air flow rate may also be based on flows to the intake manifold that bypass the throttle (e.g., throttle 20) such as flows from a brake booster (e.g., brake booster 140), fuel vapor purge canister (e.g., absorbent canister 22), and a crankcase (e.g., crankcase 114). The fuel flow rate may be estimated based on the measures engine air flow rate, and a known air flow to fuel flow ratio stored in the memory of the controller. Further, the fuel flow rate may also be estimated based on flows from fuel sources that may bypass the throttle such as flows from the fuel vapor canister and the crankcase. The throttle position may be adjusted by the controller to regulate an amount of air flowing to the intake manifold.

Graph 500 also shows changes in the brake booster vacuum at plot 508 and fuel vapor canister loading at plot 510. Brake booster vacuum may be an amount of vacuum (e.g., lower pressure relative to BP) that exists at the brake booster. Thus, the pressure in the brake booster decreases with increasing levels of vacuum. The amount of vacuum in the brake booster may be measured by a pressure sensor such as pressure sensor 146 from FIG. 1. Fuel vapor canister loading at plot 510 is an estimate of the concentration of fuel vapor in the fuel vapor canister. While fuel vapor canister loading may monotonically decrease during a drive cycle, and only increase during a refueling event, an increase in fuel vapor canister loading is shown at plot 510 in order to illustrate how the various valves may be controlled when fuel vapor canister loading increases above a threshold. For example, if fuel vapor canister loading increases above a first threshold, $F_1$, the CPV may be opened to allow fuel vapors to flow to the intake manifold during certain conditions. Thus, $F_1$ may represent a concentration level of fuel vapors in the fuel vapor canister above which purging of the fuel vapor canister is desired. The concentration of fuel vapor in the fuel vapor canister may be estimated based on a pressure in the fuel vapor canister, for example.

Graph 500 also shows changes in the position of the ASOV at 512, the CPV at 514, and the PCV valve at 516. As discussed above with reference to FIGS. 1-4, the ASOV, CPV, and PCV valve may all be controlled by the controller. The controller may adjust the valves between an open and a closed position depending on engine operating conditions.

Specifically, as elaborated above with reference to FIGS. 3 and 4, the ASOV may be adjusted from a closed first position to an open second position when it is desired to increase the level of vacuum in the brake booster. As an example, it may be desired to increase the level of vacuum in the brake booster after a user (e.g., vehicle operator 130) releases a brake pedal (e.g., input device 132). The CPV may be adjusted between a closed first position and an open second position based on the fuel vapor canister loading, a pressure in the intake manifold, the brake booster flow to the engine, and the engine air flow and fuel flow rates.

Further, the PCV valve may be adjusted between a closed first position and an open second position based on the engine air flow and fuel flow rates, the brake booster flow to the engine, a pressure in the intake manifold, and the purge flow to the intake manifold.

The respective closed first positions of the ASOV, CPV, and PCV valve may be positions in which the respective openings of the valves are sealed such that gasses may not flow through the valves. However, the respective open second positions of the ASOV, CPV, and PCV valve may be positions in which the respective openings of the valves are increased to a maximum value. Said another way, gasses may flow through the ASOV, CPV, and when the valves are in their respective open second positions.

The ASOV may be opened if the brake booster vacuum level decreases below a lower first threshold $B_2$. Thus, the lower first threshold $B_2$, may represent a vacuum level in the brake booster below which additional vacuum in the brake booster is desired. Further, if the vacuum level in the brake booster increases above a higher second threshold, $B_1$, the ASOV may be closed to reduce the amount of vacuum provided to the brake booster.

As described above with reference to FIGS. 3 and 4, in some examples, the vehicle system may be controlled such that PCV gasses may flow to the intake manifold via opening of the PCV valve only if the flow of PCV gasses would not increase the air flow rate or fuel flow rate above their respective desired rates. As a result, the amount of time the PCV valve remains open may be increased relative to systems wherein PCV flow is not actively controlled (e.g., electrically controlled). Further, PCV flow to the intake manifold may not only be increased, but also may be more consistent. A more constant PCV flow rate may increase the efficiency of the oil separators (e.g., oil separator 96), and an overall increase in PCV flow may increase engine performance during shorts trips and/or cold weather. Similarly, the system may be controlled to enable purge gasses to flow to the intake manifold via opening of the CPV valve only if the flow of purge gasses would not increase the air flow rate or fuel flow rate above their respective desired rates. Accordingly, the system described herein may enable the coordination and arbitration of three flows that enter the intake manifold downstream of the throttle. For example, brake booster, purge, and PCV flows to the intake manifold may be regulated by the controller via active control of respective valves, and may be coordinated so that one or more flows do not impede one or more other flows to the intake manifold. The condition where enabling all three flows (crankcase ventilation, aspirator, fuel vapor purge) is desirable, but where opening all three valves would result in air flow rate or fuel flow rate over target, is generally at idle when air consumption and fuel consumption is low. Thus, the system described herein prioritizes the use of each. While first priority is given to brake booster vacuum, replenishment, canister purge and crankcase ventilation are also important. At high canister loading, canister purge is given second priority, and crankcase ventilation is given third priority such that it can take air or fuel flow that is left over.

Starting before time $t_1$, the throttle is open (plot 502), and as such, engine air flow (plot 504) and engine fuel flow (plot 506) rates fluctuate around higher first levels, respectively. As shown, at this time, fuel vapor canister loading (plot 510) is be less than first threshold $F_1$. As such, the CPV may be closed before time $t_1$. Brake booster vacuum level (plot 508) may be greater than the lower first threshold $B_2$, but less than the upper second threshold $B_1$, before time $t_1$. Accordingly, the ASOV may be closed before time $t_1$. The PCV valve may be open before time $t_1$, so long as the flow of PCV gasses to the intake manifold does not cause the air flow rate or fuel flow rates to increase above their desired threshold rates.

At time $t_1$, the throttle is closed. The throttle may close as a result of the vehicle operator depressing the brake pedal. As a result of the throttle closing, both the engine air flow rate and engine fuel flow rate may decrease at time $t_1$. Specifically, the airflow to the engine may decrease as a result of the closing of the throttle, and the controller may decrease the fuel flow rate accordingly, to match a desired air flow to fuel flow ratio. Further, the brake booster vacuum level may decrease below the lower first threshold, $B_2$, at time $t_1$. The brake booster vacuum level may decrease due to the vehicle operator depressing the brake pedal. In response to the brake booster vacuum level decreasing below $B_2$, the ASOV may be opened at time $t_1$. Additionally, the PCV valve may be closed at time $t_1$, due to the decrease in desired fuel flow rate. Thus, the PCV valve may be closed at time $t_1$, to reduce the likelihood of exceeding the desired fuel flow rate. The CPV may remain closed at time $t_1$.

From time $t_1$ to time $t_2$, the throttle, CPV, and PCV valve may remain closed. The ASOV may remain open, and the fuel vapor canister loading may continue to decrease monotonically. Due to the ASOV remaining open during the time interval from $t_1$ to $t_2$, the brake booster vacuum level may increase from below the first threshold $B_2$, to above the lower first threshold $B_2$. However, the brake booster vacuum level does not increase above the upper second threshold $B_1$. Due to the throttle staying in the closed position, the engine air flow and engine fuel flow rates may continue to be lower than their upper first levels before time $t_1$.

Moving on to time $t_2$, the throttle is re-opened. In response to the throttle opening at $t_2$, the engine air flow rate and engine fuel flow rate may increase to similar levels to before time $t_1$. Due to the brake booster level increasing above the lower first threshold $B_2$, the ASOV may be closed at time $t_2$. Further, the PCV valve may be opened at time $t_2$. The CPV may remain closed at $t_2$, as the fuel vapor canister loading remains below the first threshold $F_1$.

From time $t_2$ to time $t_3$, the throttle, and PCV valve may remain open. The ASOV may remain closed, and the fuel vapor canister loading may continue to decrease. Due to the ASOV remaining closed during the time interval from $t_2$ to $t_3$, the brake booster vacuum level may decrease, but may remain above the lower first threshold $B_2$. Due to the throttle remaining in the open position, the engine air flow and engine fuel flow rates may continue to fluctuate around their upper first levels, as before time $t_1$.

Moving on to time $t_3$, the brake booster vacuum level may decrease below the lower first threshold $B_2$. In response to the brake booster vacuum level decreasing below $B_2$, the ASOV may be opened at time $t_3$. At time $t_3$, the throttle remains open. Due to the throttle remaining in an open position, the engine air flow rate and engine fuel flow rate continue at similar levels to before time $t_1$. Further, the PCV valve may remain open at time $t_3$. The CPV may remain closed at time $t_3$, as the fuel vapor canister loading remains below the first threshold $F_1$.

From time $t_3$ to time $t_4$, the throttle, ASOV, and PCV valve may remain open. At this time, the fuel vapor canister loading is not above the first threshold $F_1$, and as such the CPV may remain closed. However, as shown, canister loading is increasing, e.g., due to a refueling event. It will be appreciated that the increase in canister loading is shown only to illustrate the behavior and control of the system when canister loading is above a threshold; otherwise, the other plots shown in FIG. 5 illustrate conditions during a drive cycle, rather than during engine off conditions when refueling would normally occur.

Due to the ASOV remaining open during the time interval from $t_3$ to $t_4$, the brake booster vacuum level may increase above the lower first threshold $B_2$, but may remain below the upper second threshold $B_1$. Due to the throttle remaining in the open position, the engine air flow and engine fuel flow rates may continue to fluctuate around their upper first levels, as before time $t_1$.

At time $t_4$, the fuel vapor canister loading may increase above the first threshold $F_1$. In response to the fuel vapor canister loading increasing above the first threshold $F_1$ (e.g., due to a refueling event), the CPV may be opened at $t_4$. At time $t_3$, the throttle remains open. Due to the throttle remaining in an open position, the engine air flow rate and engine fuel flow rate continue at similar levels to before time $t_1$. However, due to the increased fuel vapors flowing to the intake manifold as a result of opening of the CPV, the PCV valve is closed at $t_4$. Thus, the PCV valve is closed at $t_4$, to reduce the likelihood of exceeding the desired fuel flow rate. The ASOV may remain open at $t_4$.

From time $t_4$ to time $t_5$, the throttle, CPV, and ASOV may remain open. The fuel vapor canister loading may decrease below threshold $F_1$ in response to the CPV remaining open from time $t_4$ to time $t_5$. Due to the ASOV remaining open during the time interval from $t_1$ to $t_2$, the brake booster vacuum level may continue to increase above first threshold $B_2$, but may remain below second threshold $B_1$. Due to the throttle, ASOV, and CPV staying in the open position, and the engine air flow and engine fuel flow rates may increase from their upper first levels before time $t_4$.

At time $t_5$, the PCV valve may be re-opened. At time $t_5$, the fuel vapor canister loading may continue to decrease below $F_1$. The CPV may remain open at time $t_5$. In response to CPV remaining open, the fuel vapor canister loading may continue to decrease below the first threshold $F_1$. At time $t_5$, the throttle remains open. The ASOV may also remain open at time $t_5$. In response to the ASOV remaining open, the brake booster vacuum level may continue to increase at time $t_5$, but may remain below the first threshold, $F_1$. Due to the throttle, CPV and ASOV remaining in open positions, and the PCV valve opening, the engine air flow rate and engine fuel flow rate may continue to increase at time $t_5$.

From time $t_5$ to time $t_6$, the CPV and PCV valve may remain open. Additionally, fuel vapor canister loading may continue to decrease below $F_1$ due the CPV remaining open. The throttle remains open, as well as the ASOV. In response to the ASOV remaining open, the brake booster vacuum level may continue to increase but may remain below the first threshold, $F_1$. Due to the throttle, CPV, PCV valve, and ASOV remaining in open positions, the engine air flow rate and engine fuel flow rate may continue to increase.

At time $t_6$, the brake booster vacuum level may increase above the higher second threshold $B_1$. In response to the increase in the brake booster vacuum level above $B_1$, the ASOV may be closed at time $t_6$. In response to the closing of the ASOV, the engine air flow rate may decrease at time $t_6$. The CPV remains open at time $t_6$. As such, vapor canister loading may continue to decrease below $F_1$ due the CPV remaining open. The throttle also remains open. Due to the throttle remaining open, and the CPV and PCV valve remaining open, the engine fuel flow rate may continue to fluctuate at a level similar to that as between time $t_5$ and time $t_6$.

From time $t_6$ to time $t_7$, the CPV and PCV valve may remain open. Additionally, fuel vapor canister loading may continue to decrease below $F_1$ due the CPV remaining open. The throttle remains open. However, the ASOV remains closed. As a result of the ASOV remaining closed, the brake booster vacuum level decrease below the higher second threshold $B_1$, but may remain above the lower first threshold, $B_2$. Due to the throttle, CPV, and PCV valve, remaining in open positions, the engine air flow rate and engine fuel flow rate may continue to fluctuate around levels similar to that at time $t_6$.

At time $t_7$, fuel vapor canister loading may decrease to a level similar to that as before time $t_1$. In response to the decrease in fuel vapor canister loading, the CPV valve may be closed at time $t_7$. Additionally, closing the CPV may reduce the likelihood of increasing the fuel flow rate past the desired fuel flow rate since the PCV valve is open at $t_7$. The brake booster vacuum level may continue to fluctuate between the lower first threshold, $B_2$, and the higher second threshold, $B_1$. As a result, the ASOV may remain closed at time $t_7$. The throttle and PCV valve may remain open at $t_7$. In response to the throttle and PCV valve remaining open at time $t_7$, the engine air flow rate and engine fuel flow rate may both fluctuate around similar levels to those between time $t_6$ and time $t_7$.

Thus, graph 500 shows how the flow of gasses from a fuel vapor canister, brake booster, and crankcase to an intake manifold may be regulated. Specifically, the amount of time a PCV valve is open may be increased, without causing engine air flow and engine fuel flow rates to exceed desired rates. The PCV valve may only be closed under conditions where opening the PCV valve would result in the engine air flow and engine fuel flow rates exceeding their desired respective rates.

Thus, a method may include adjusting a positive crankcase ventilation (PCV) valve, canister purge valve (CPV), and an aspirator shut-off valve (ASOV) based on engine operating conditions. The three valves may be positioned in three distinct flow paths to the intake manifold that bypass a throttle in an intake passage of the engine. Specifically, the ASOV may be positioned in a first flow path between a brake booster and the intake manifold, the CPV may be positioned in a second flow path between a fuel vapor purge canister and the intake manifold, and the PCV valve may be positioned in a third flow path between a crankcase and the intake manifold. Each valve may be an electrically-controlled valve that may be controlled may a controller of an engine. Thus, by adjusting the position of the three valves, the method may manage three separate flows to the intake manifold that bypass a throttle in an intake passage. Brake booster flow may be regulated by adjusting the position of the ASOV, canister purge fuel vapors may be regulated by adjusting the position of the CPV, and PCV gasses may be regulated by adjusting the position of the PCV valve.

In cold operation, it may typically be futile to purge a vapor storage canister, as attempting to strip adhered fuel from a cold canister may be unproductive. Further, in cold operation, it is crankcase ventilation that tends to be the priority because cold operation is when a fuel-in-oil condition is most likely to occur. Any humidity that can be cleared from the crankcase during cold weather is also a gain, as it is water in oil that draws in the NO that forms nitric acid and engine sludge. The system described herein recognizes that there is little fuel coming from the canister, and thus switches the priority to crankcase ventilation. Such operation may be especially advantageous during cold engine operation (e.g., during engine operation at 40° F. and below) feature. Canister purge systems often shut off at cold operation; however, traditional PCV systems don't take advantage of the extra air flow rate available for them at this time, and instead just continue to use lower than optimal crankcase ventilation rates. In contrast, the system described herein has the effect of increasing crankcase ventilation flow in cold weather, and/or when the canister purge system is off.

In this way, a technical effect of increasing the uniformity and amount of PCV flow from a crankcase to an intake manifold is achieved, by adjusting the position of an electrically-controlled valve positioned in a flow path between the crankcase and the intake manifold of an engine. By increasing the uniformity and amount of PCV flow to the crankcase, the efficiency of oil separators may be increased. Additionally, engine performance during cold conditions and/or short engine run periods may be increased. The PCV may be closed if one or more of the engine air flow and engine fuel flow rate exceed desired respective threshold levels. Further, the PCV flow to the intake manifold may be increased without restricting flows from a fuel vapor purge canister or a brake booster to the intake manifold. Specifically, the PCV valve may be closed if one or more of a CPV and an ASOV are open and opening the PCV valve would cause engine air flow rate or fuel flow rate to increase above desired levels.

In another representation, the PCV valve may also be closed if an engine transmission is in neutral, a FEAD load is below a threshold level, and the engine and one or more catalysts in the engine are above a threshold temperature, or have been operating for more than a threshold amount of time. For example, a method for an engine may include determining a desired engine air flow rate based on engine operating conditions. The method may further include maintaining an electrically-controlled crankcase ventilation valve open to allow crankcase ventilation flow to enter an engine intake downstream of an intake throttle while the desired engine air flow rate is above a threshold, and closing the crankcase ventilation valve to disable the crankcase ventilation flow if the desired engine air flow rate falls below the threshold. The threshold may correspond to an engine air flow rate appropriate during minimum engine air flow conditions, which may occur if the engine transmission is in neutral, a FEAD low is below a threshold level, and the engine and one or more catalysts in the engine are above a threshold temperature, or have been operating for more than a threshold amount of time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
electrically controlling a crankcase ventilation valve to selectively enable crankcase ventilation flow into an engine intake downstream of a throttle based on desired engine air and fuel flow rates, current engine air flow rate contributions from a brake booster, and current engine air and fuel flow rate contributions from a fuel vapor purge system, including electrically controlling the crankcase ventilation valve to disable crankcase ventilation flow into the engine intake and electrically controlling a canister purge valve to disable flow from the fuel vapor purge system into the engine intake in response to current engine air flow rate contributions from the brake booster exceeding a desired engine air flow rate.

2. The method of claim 1, further comprising:
electrically controlling the canister purge valve to enable flow from the fuel vapor purge system into the engine intake in response to the current engine air flow rate contributions from the brake booster not exceeding the desired engine air flow rate, fuel vapor purging conditions being present, and estimated engine air and fuel flow rates with fuel vapor purge flow enabled not exceeding the desired engine air and fuel flow rates, respectively.

3. The method of claim 2, further comprising:
electrically controlling the crankcase ventilation valve to enable crankcase ventilation flow into the engine intake in response to the current engine air flow rate contributions from the brake booster not exceeding the desired engine air flow rate, fuel vapor purging conditions being present, and estimated engine air and fuel flow rates with both fuel vapor purge flow and crankcase ventilation flow enabled not exceeding the desired engine air and fuel flow rates, respectively.

4. The method of claim 2, further comprising:
electrically controlling the canister purge valve to disable flow from the fuel vapor purge system into the engine intake and electrically controlling the crankcase ventilation valve to enable crankcase ventilation flow into the engine intake, in response to the current engine air flow rate contributions from the brake booster not exceeding the desired engine air flow rate, fuel vapor purging conditions not being present, and estimated engine air and fuel flow rates with fuel vapor purge flow disabled and crankcase ventilation flow enabled not exceeding the desired engine air and fuel flow rates, respectively.

5. The method of claim 1, further comprising adjusting at least one actuator of the engine to reduce engine torque if the current engine air flow rate contributions from the brake booster exceed the desired engine air flow rate.

6. The method of claim 1, wherein electrically controlling the crankcase ventilation valve comprises controlling a solenoid valve integrated in the crankcase ventilation valve.

7. A system for a vehicle engine, comprising:
a brake booster having a vacuum reservoir coupled to an intake of the engine downstream of an intake throttle;
a fuel vapor purge system selectively fluidly coupled to the intake downstream of the intake throttle based on a state of a canister purge valve;
an engine crankcase selectively fluidly coupled to the intake downstream of the throttle based on a state of a solenoid integrated in a crankcase ventilation valve;
an aspirator having a motive inlet coupled to the intake upstream of a turbocharger compressor, a motive outlet coupled to the intake downstream of the throttle, and a suction inlet coupled to the vacuum reservoir of the brake booster; and
an electrically-controllable shut-off valve arranged in series with the aspirator.

8. The system of claim 7, wherein the crankcase ventilation valve further comprises a first orifice, a second orifice smaller than the first orifice, and a third orifice smaller than the second orifice.

9. The system of claim 8, wherein the first orifice is arranged in series with a variable pressure control valve, the series arrangement of the first orifice and the variable pressure control valve arranged in parallel with the second orifice, wherein the third orifice is arranged in parallel with a check valve, and wherein the parallel arrangement of the first orifice and the variable pressure control valve with the second orifice is arranged in series with the parallel arrangement of the third orifice with the check valve.

10. The system of claim 9, wherein the solenoid is arranged in series with the series arrangement of the parallel arrangement of the third orifice with the check valve and the parallel arrangement of the first orifice and the variable pressure control valve with the second orifice.

11. The system of claim 8, wherein the first orifice is arranged in parallel with the second orifice, wherein the third orifice is arranged in parallel with a check valve, and wherein the parallel arrangement of the first orifice with the second orifice is arranged in series with the parallel arrangement of the third orifice with the check valve.

12. The system of claim 11, wherein the solenoid is arranged in series with the series arrangement of the parallel arrangement of the third orifice with the check valve and the parallel arrangement of the first orifice with the second orifice, and wherein the crankcase ventilation valve does not include a variable pressure control valve.

13. A method for an engine, comprising:
closing an electrically-controlled crankcase ventilation valve to disable crankcase ventilation flow into an intake downstream of a throttle in response to an engine transmission being in neutral, the engine and an exhaust catalyst being warmed up, and a front end accessory drive load being below a threshold.

14. The method of claim 13, further comprising:
closing the crankcase ventilation valve in response to a request for brake booster replenishment when an engine air flow rate during the brake booster replenishment with the crankcase ventilation valve open will exceed a desired engine air flow rate.

15. The method of claim 14, further comprising:
delaying fuel vapor purging by maintaining a canister purge valve in a closed position in response to a request for brake booster replenishment and fuel vapor purging when an engine air flow rate during the brake booster replenishment with the canister purge valve open and the crankcase ventilation valve closed will exceed the desired engine air flow rate.

16. The method of claim 15, further comprising:
opening the crankcase ventilation valve in response to simultaneous brake booster replenishment and fuel vapor purging being performed when an engine air flow rate during the simultaneous brake booster replenishment and fuel vapor purging with the crankcase ventilation valve open will not exceed the desired engine air flow rate.

17. The method of claim 16, further comprising opening an electrically-controlled shut-off valve arranged in series with an aspirator during brake booster replenishment, the aspirator having a motive inlet coupled to the intake upstream of a turbocharger compressor, a motive outlet coupled to the intake downstream of the throttle, and a suction inlet coupled to a vacuum reservoir of a brake booster.

18. The method of claim 16, further comprising:
closing the crankcase ventilation valve in response to simultaneous brake booster replenishment and fuel vapor purging being performed when the engine fuel flow rate during the simultaneous brake booster replenishment and fuel vapor purging with the crankcase ventilation valve open will exceed the desired engine fuel flow rate.

* * * * *